W. T. JOLLIFFE.
WIND SCREEN FOR MOTOR CARS AND THE LIKE.
APPLICATION FILED DEC. 17, 1910.
1,062,402.
Patented May 20, 1913.
3 SHEETS—SHEET 3.
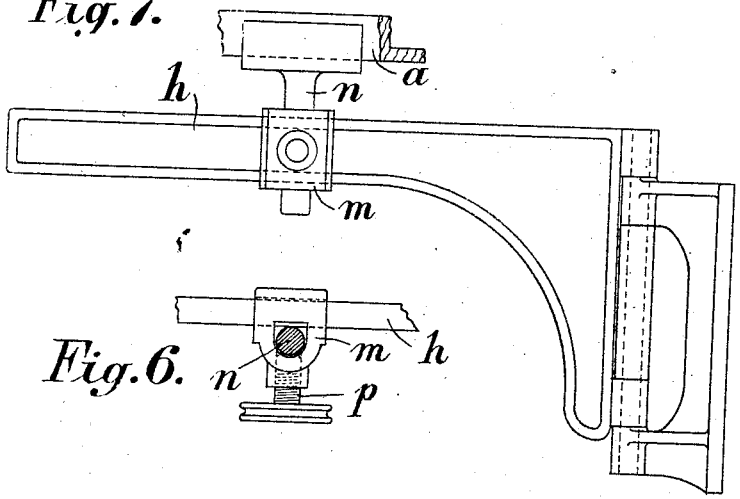
Fig. 7.
Fig. 6.
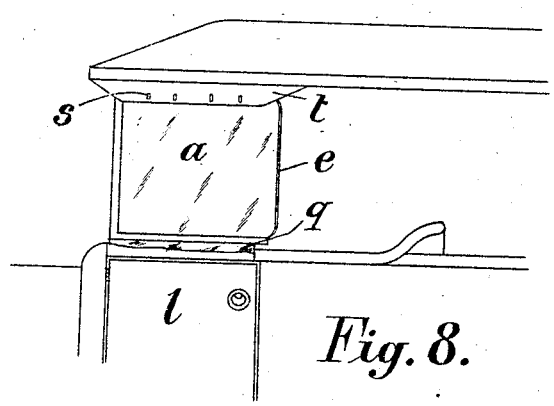
Fig. 8.
Witnesses
James R. Mansfield
L. E. Witham
Inventor
William T. Jolliffe
By:
Alexander T. Sowell
Attorney.

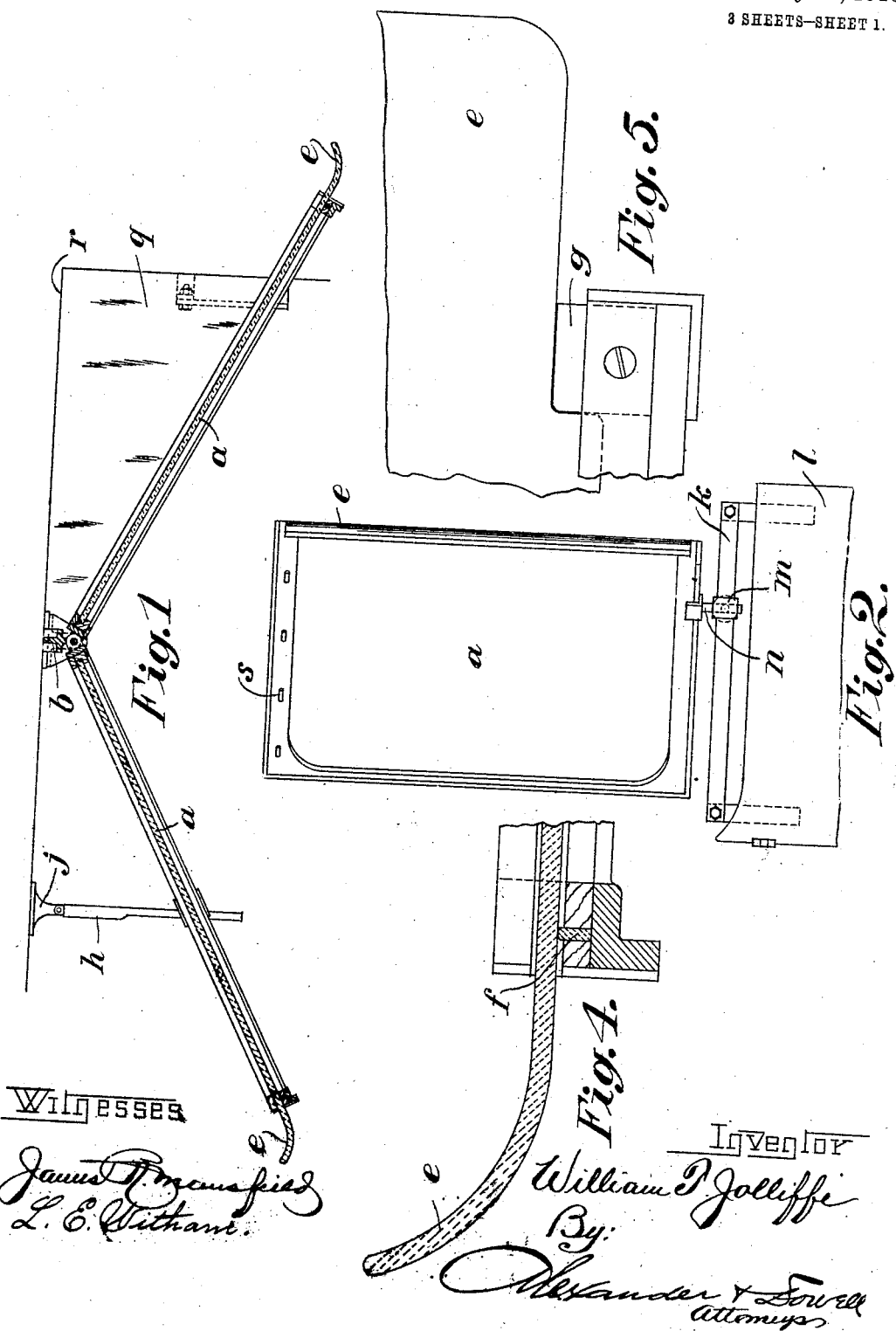

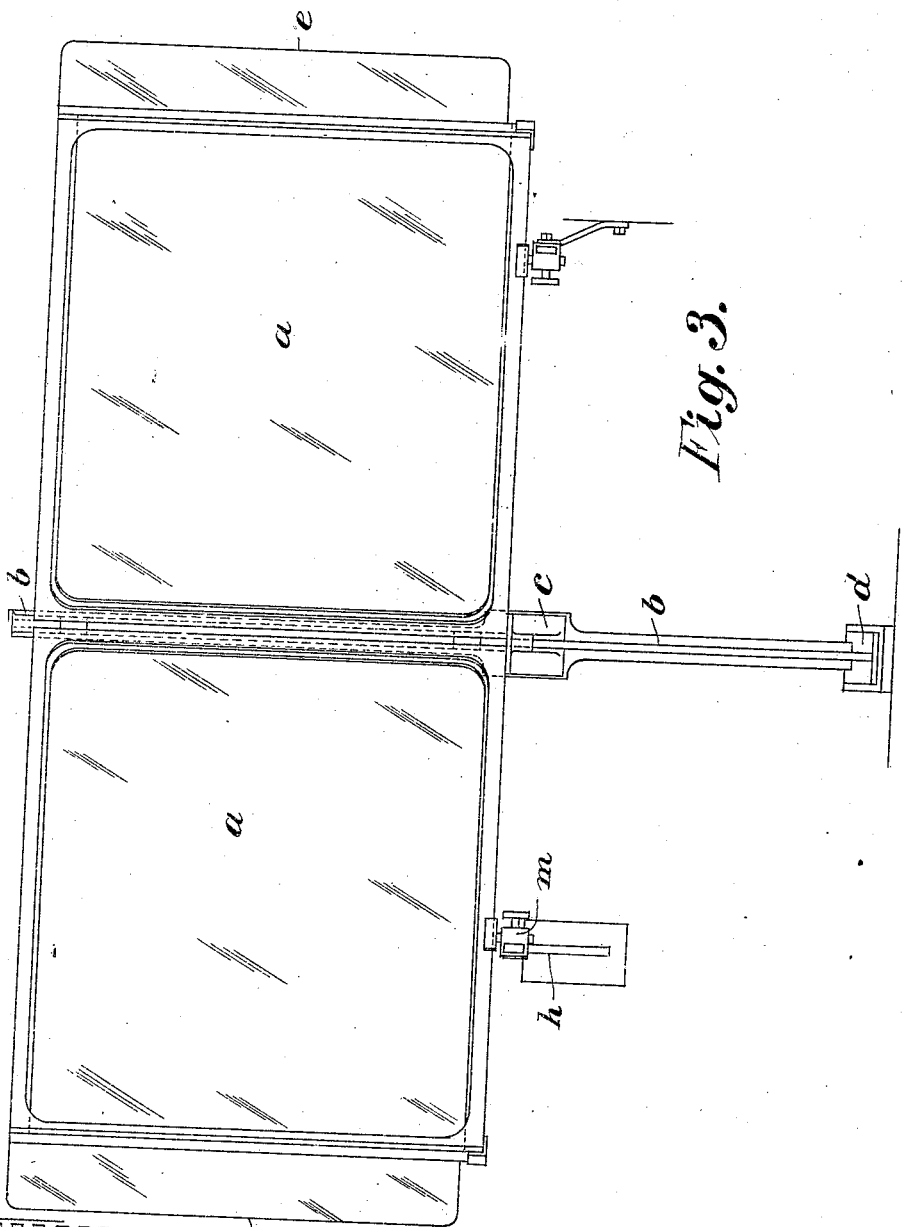

UNITED STATES PATENT OFFICE.

WILLIAM THOMAS JOLLIFFE, OF ROSSETT, ENGLAND.

WIND-SCREEN FOR MOTOR-CARS AND THE LIKE.

1,062,402.     Specification of Letters Patent.     Patented May 20, 1913.

Application filed December 17, 1910. Serial No. 597,848.

*To all whom it may concern:*

Be it known that I, WILLIAM THOMAS JOLLIFFE, a subject of the King of Great Britain, residing at Rossett, in the county of Denbigh, in the Principality of Wales, England, have invented certain new and useful Improvements in Wind-Screens for Motor-Cars and the Like, of which the following is a specification.

This invention relates to the type of transparent screens for motor cars and the like in which the screen consists of two wings extending laterally from a central post on which they are supported by means of hinges or otherwise and adapted to be set at an angle so as to produce but small wind resistance while deflecting the air laterally and thus shielding the occupants of the car or the like.

The invention will be described with reference to the accompanying drawings which show one embodiment of the invention applied to a motor car. It is to be understood, however, that the invention is applicable, either wholly or in part, for the purpose of protecting the occupants of vehicles other than motor cars. In these drawings:—Figure 1 is a plan view partly in section of a screen constructed in accordance with the present invention. Fig. 2 is a side elevation showing one method of supporting and angularly adjusting the outer end of one side of the screen. Fig. 3 is a front elevation of the screen. Figs. 4 to 7 show details of the structure; and Fig. 8 is a side view of part of a car fitted with a screen in accordance with this invention.

The two wings $a$ are supported at the center on the upper part of the post $b$ which is attached to the car at $c$ and $d$. At the sides of the two wings $a$, curved extensions $e$ are provided. These extensions are arranged so that their hollow faces are directed forwardly so as to throw out the air more effectually at the lateral edges of the screen and so as to prevent currents of air from striking back upon the occupants of the car and the like. If, as in the case illustrated, the screen is made with sheets of plate glass in the wings $a$, the curved edges $e$ may either be in one with the plate glass (as shown in Figs. 1, 4 and 5) or there may be additional pieces of glass or other suitable material attached to the edges of the frame and supported if required by suitable brackets. In the arrangement of the extensions $e$ illustrated in the accompanying drawings the sheets of glass are supported in the outer members of the frame by means of packing pieces $f$ and $g$ formed of rubber or like material.

The arrangement for obtaining the angular adjustment of the wings and securing them in position when adjusted consists of a bar mounted so as to swing on a vertical or approximately vertical pivot and carrying a sliding piece to which the wing is adapted to be connected by a pivotal joint. This pivotal joint also allows of relative vertical motion between the sliding piece and the wing as this latter is adjusted. A locking or clamping device is provided for the pivotal connection and the sliding piece in position on the bar when required. The bar $h$ shown in Figs. 1 and 3 of the accompanying drawings and shown in detail in Figs. 6 and 7 is mounted by means of a hinge on a bracket $j$ and is connected with the wing $a$ in the manner above indicated and more fully described hereafter.

In order that the screen may protect the occupants of the car it will be generally necessary to place it in such a position that the outer sides of the wings extend over or in front of the doors at the sides of the car which gives access to the seats. Accordingly it is necessary when a person is entering or leaving the car to swing one of the wings forward. If the bar, on which the sliding piece above mentioned is carried, is arranged on the upper part of one of the doors, it follows that when the door is swung open the sliding piece will be moved along the bar so as to cause the wing to turn on its hinge and move into such a position that it no longer forms an obstruction to a person entering or leaving the car. This arrangement of the bar is shown in Fig. 2. In this case the bar $k$ is mounted on the upper part of the door $l$ so as to move therewith. Where it is desired to use the door at one side of the car only, it will be obvious that there will be no necessity for angular adjustment of the wing at the other side so that a fixed bracket may be provided for supporting its outer end.

The sliding piece is provided with a longitudinal slot to enable it to move on the bar and with a vertical socket or pin co-acting with a corresponding pin or socket on the lower edge of the wing, the pin being free to have motion relative to the socket both vertically and angularly when being adjusted so that it may move freely with the part on which it is mounted even if the axes about which the wing and swinging arm turn are not exactly parallel.

It is preferable to arrange the parts so that the pin is formed on or firmly attached to the wing, and the socket is formed in the sliding piece, as shown in the drawings (see particularly Figs. 6 and 7). In this form the sliding piece m which works on the swinging bar h (or k), receives the pin n which is attached to the wing a. For clamping the pivotal and sliding parts, a screw device may be provided as for instance the set screw p, which is adapted to press upon the pin n and move it into engagement with the bar h (or k) so as to clamp the sliding piece m, the bar h (or k) and the pin n together. It is of course necessary to provide that the socket allows for some lateral movement of the pin and that the socket at one edge intersects the slot, as shown in Fig. 6.

Instead of a screw device a part having a cam or wedge action may be provided to give the clamping pressure. The clamping action may be brought about automatically by forming the bar so that, when the sliding piece has traveled along it to the position in which it is to be secured, the form of the bar at this part brings about the clamping of the parts. For this purpose the bar may, for instance, be formed of a gradually enlarging section at this part so that it acts as a wedge in the socket in the sliding piece, or a separate wedge or cam may be mounted on the bar to engage in a socket in the sliding piece provided for this purpose.

Instead of attaching the pivotal pin or its equivalent directly to the wing it may be mounted on a second sliding piece carried on the lower bar of the wing frame and adjustable thereon so as to afford greater facilities for adjustment.

Between the adjacent parts of the vehicle and the screen, flaps q (Fig. 1), and t (Fig. 8) are provided which will cover over the spaces left between the wings a and the dash-board r and the top of the car. In the drawing a flap is shown at one side only of the screen, it will be understood, however, that a similar flap will be placed at the other side. These flaps may be of waterproof canvas or the like affixed to the edges of the wings a of the screen, and provided with suitable fastenings for attaching the flaps to the dash-board and the top of the car and over the doors or the sides of the car at each end of the front platform. The flaps may be held by straps or by studs s (Figs. 2 and 8) or in any other convenient manner, which will allow the flaps to be adjusted if required when the angle of the wings of the screen is adjusted.

I declare that what I claim is:—

A wind screen for vehicles comprising a central supporting device rigidly mounted on the vehicle, a pair of lateral wings pivotally connected with said device, means for angularly adjusting and securing one of said wings, said means consisting of a bar, means for mounting said bar on a side door of the vehicle, a sliding piece on said bar, a pivotal joint connecting said sliding piece with the wing, and means for clamping the sliding piece and the pivotal joint.

In witness whereof, I have hereunto signed my name this 9 day of December 1910, in the presence of two subscribing witnesses.

WILLIAM THOMAS JOLLIFFE.

Witnesses:
 HUBERT A. GILL,
 RICHARD W. WILLIAMS.